United States Patent [19]

Alfenaar et al.

[11] 4,403,018

[45] Sep. 6, 1983

[54] APPARATUS FOR SUPPLYING OR DRAINING A FLUID TO OR FROM THE MARGINAL PORTION OF A FLAT FUEL CELL ELECTRODE AND AN ELECTRODE ELEMENT AND A FUEL CELL PROVIDED WITH SUCH AN APPARATUS

[75] Inventors: Marinus Alfenaar, Schinnen; Joannes J. P. Leijen, Sittard; Willem J. Schlösser, Kerkrade, all of Netherlands

[73] Assignee: Electrochemische Energieconversie, N.V., Bol, Belgium

[21] Appl. No.: 268,250

[22] Filed: May 29, 1981

[30] Foreign Application Priority Data

May 31, 1980 [NL] Netherlands ............... 8003193

[51] Int. Cl.³ .................................. H01M 8/04
[52] U.S. Cl. ................................. 429/34; 429/39
[58] Field of Search ................. 429/34, 38, 39, 72

[56] References Cited

U.S. PATENT DOCUMENTS

| 3,717,505 | 2/1973 | Unkle, Jr. et al. | 429/27 |
| 3,814,631 | 6/1974 | Warszawski et al. | 429/39 |
| 3,901,731 | 8/1975 | Warszawski et al. | 429/9 |
| 4,124,478 | 11/1978 | Tsien et al. | 429/39 |

Primary Examiner—Anthony Skapars

[57] ABSTRACT

Apparatus for supplying or draining a fluid to or from a marginal portion of a flat fuel cell electrode, consisting of a supply or drainage device for the fluid, which is connected with a spacious collecting channel (5) which runs substantially parallel to the marginal portion of the fuel cell electrode and which is connected with a number of substantially equidistantly spaced points of this marginal portion via micro-channels (4), these micro-channels having substantially identical dimensions and a width b that is smaller than their depth d. Preferably b/d is at most 0.9, and H/h is larger than 3, H and h being the hydraulic diameters of, respectively, the collecting channel (5) and the micro-channels (4).

5 Claims, 2 Drawing Figures

APPARATUS FOR SUPPLYING OR DRAINING A FLUID TO OR FROM THE MARGINAL PORTION OF A FLAT FUEL CELL ELECTRODE AND AN ELECTRODE ELEMENT AND A FUEL CELL PROVIDED WITH SUCH AN APPARATUS

The invention relates to an apparatus for supplying or draining a fluid to or from the marginal portion of a flat fuel cell electrode, which electrode is mounted in a frame thus forming with this frame and the apparatus an electrode-element, which apparatus contains at least a supply or drainage device for the fluid.

Such an apparatus is known from U.S. Pat. No. 3,901,731 the disclosure of which is incorporated herein by reference. This known apparatus consists of a number of supply or drainage channels for electrolyte which are connected, via a number of micro-channels running in a plane parallel to the longitudinal plane of a plastic frame, in which frame a flat electrode is mounted and which frame incorporates the apparatus, and a distribution area having a rather complicated structure, with a marginal portion of the flat electrode. The total of electrode, plastic frame and apparatus from an electrode-element. The micro-channels are open at the upper side, which side is situated in one of the two outer planes of the plastic frame that are parallel to the longitudinal plane of said plastic fame, when the electrode-element is not assembled, e.g. with other elements in an electrode-stack or a battery. According to this U.S. patent specification the micro-channels vary in length, width b and depth d, b/d being at least 1.5. The high b/d has as a result that the hydraulic diameter of the micro-channel will to a large extent become dependent upon the value of d. Small variations of d, (which are not identical for the various micro-channels, e.g. as a result of the penetration of slight amounts of sealing material when the channel tops are sealed, e.g. when the electrode-element is attached to an other element to form a batttery), thus have a very large influence on the distribution of the fluid among the various channels. This renders it practically impossible to manufacture a fuel cell consisting of a stack of electrode elements that is provided with such apparatuses according to U.S. Pat. No. 3,901,731 and in which the required fluids are uniformly supplied to and drained from all electrodes.

The apparatus provided according to the present invention overcomes this disadvantage.

The present apparatus, for supplying or draining a fluid to the marginal portion of a flat fuel cell electrode, which electrode is mounted in a frame thus forming with this frame and the apparatus an electrode-element, which apparatus contains at least a supply or drainage device for the fluid, is characterized in that said supply or drainage device is connected with a spacious collecting chamber which runs in a plane parallel to the longitudinal plane of the frame and runs substantially parallel to said marginal portion of the fuel cell electrode and which is connected with a number of substantially equidistantly spaced points of this marginal portion via micro-channels. These micro-channels run in a plane parallel to the longitudinal plane of the frame and are open at the upper side, which side is situated in one of the two outer planes of the frame that are parallel to the longitudinal plane of the said frame, when the electrode-element is not assembled and have substantially identical dimensions and a width b that is smaller than their depth d. The b/d therefore preferably is at most 0.9, more in particular at most 0.5.

It is remarked that from the U.S. Pat. No. 3,717,505 an apparatus is known for supplying or draining a fluid to the marginal portion of a fuel cell electrode, that consists of a supply or drainage device for the fluid, which device is connected with a spacious collecting channel which runs substantially parallel to the said marginal portion of the fuel cell electrode and which is connected with a number of substantially equidistantly spaced points of this marginal portion via connecting channels. However, these connecting channels have a round cross section and are comprised totally in the material of the frame that surrounds the electrode. They do not have an open upper side situated in one of the two outer planes of said frame that are parallel to the longitudinal plane of said frame.

The collecting chamber in the apparatus according to present invention has a hydraulic diameter H that is much larger than the hydraulic diameter h of the micro-channels. The ratio between the hydraulic diameter H of the collecting channel and the hydraulic diameter h of the micro-channels preferably is larger than 3, more in particular larger than 5.

Figure 1:
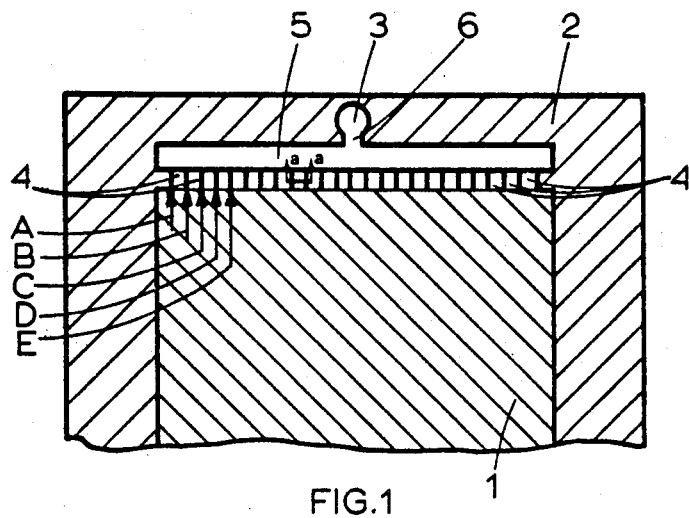
FIG. 1 illustrates an end-view cross section of an embodiment of an apparatus according to the invention.

In FIG. 1, a flat fuel cell electrode 1 is mounted in a plastic mounting frame 2, which includes a supply channel 3 which forms together with opening 6 a supply device. Supply channel 3 is in open fluid communication with collecting chamber 5 via the opening 6. A plurality of micro-channels 4, is provided in frame 2, and in open fluid communication with both the flat electrode 1 and the collecting chamber 5. The micro-channels 4 are preferably equidistant from each other, that is, the distance between points A and B, B and C, C and D, etc. are preferably substantially equal.

Figure 2:
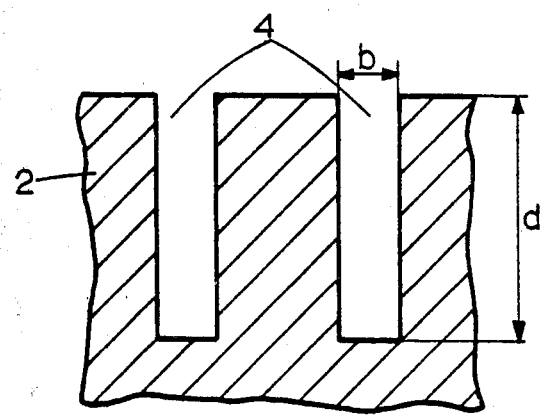
FIG. 2 illustrates in detail a cross-section along line A—A in FIG. 1.

FIG. 2 shows in greater detail a cross-section (not exactly to scale) across two micro-channels 4, illustrating that the width b is substantially smaller than depth d.

By means of the apparatus provided by the present invention, the electrolyte or other fluid required for operation of the fuel cell may be supplied to or drained therefrom with a much improved and substantially uniform distribution thereof to the electrode element, and to a plurality of the electrode elements arranged in the entire fuel cell.

The invention also relates to an electrode-element consisting of a flat electrode in a frame, which frame is preferably made of thermoplastic material and provided with one or more apparatuses according to the invention for the supply and/or discharge of one or more fluids to and/or from one or more marginal portions of the flat electrode.

The invention further relates to a fuel cell or battery consisting of a stack of elements, one or more of which are electrode elements as referred to.

We claim:

1. Apparatus for supplying or draining a fluid to or from a marginal portion of a flat cell electrode, which electrode is mounted in a frame thus forming with this frame and apparatus an electrode-element, which apparatus consists of at least a supply or drainage device for the fluid, wherein said supply or drainage device is in communication with a collecting chamber which runs in a plane parallel to the longitudinal plane of the frame and runs substantially parallel to said marginal portion of the fuel cell electrode and which is in further communication with a number of substantially equidistantly spaced points of this marginal portion via micro-channels, which micro-channels run in a plane parallel to the longitudinal plane of the frame and are open at the upper side, which side is situated in one of the two outer planes of the frame that are parallel to the longitudinal plane of the said frame, when the electrode-element is not assembled and have substantially identical dimensions and a width b that is smaller than their depth d.

2. Apparatus according to claim 1, wherein b/d is at most 0.9.

3. Apparatus according to claim 1, wherein b/d is at most 0.5.

4. Apparatus according to any one of the claims 1–3, wherein the ratio between the hydraulic diameter H of the collecting channel and the hydraulic diameter h of the micro-channels is greater than 3.

5. Apparatus according to claim 4, wherein the ratio between the hydraulic diameter H of the collecting channel and the hydraulic diameter h of the micro-channels is greater than 5.

* * * * *